W. F. HAYES.
NUT LOCK.
APPLICATION FILED AUG. 2, 1915.

1,173,959.

Patented Feb. 29, 1916.

Witness
W. A. Williams
Mildred P. Imurie

Inventor
Wm. F. Hayes,
By J. Trewin
Attorney

UNITED STATES PATENT OFFICE.

WILLIAM F. HAYES, OF STROUDSBURG, PENNSYLVANIA.

NUT-LOCK.

1,173,959. Specification of Letters Patent. Patented Feb. 29, 1916.

Application filed August 2, 1915. Serial No. 43,221.

*To all whom it may concern:*

Be it known that I, WILLIAM F. HAYES, of Stroudsburg, in the county of Monroe and State of Pennsylvania, have invented certain new and useful Improvements in Nut-Locks; and I do hereby declare the following to be a full, clear, and exact description of the invention, such as will enable others skilled in the art to which it appertains to make and use the same.

This invention relates to nut-locks and the object is to provide simple and efficient means for locking the nut to the bolt, the nut and its locking means being capable of being readily and easily stamped, cast or pressed, and then coupled to form a practically single unit.

Figure 1:
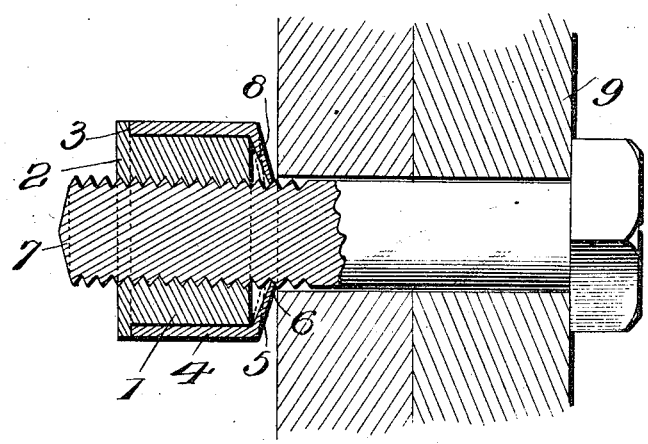
Figure 2:
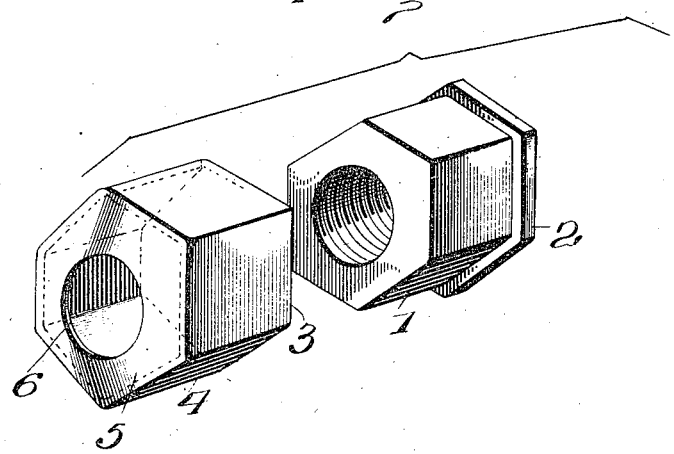

In the accompanying drawings, Figure 1 is a horizontal sectional view showing the nut in locked position on a bolt. Fig. 2 is a perspective of the nut and its locking means removed.

Referring to the drawings, 1 designates a nut which is shown as circumferentially flanged, as at 2, to form an abutment for the end 3 of a superposed cap 4 constituting a locking nut, the sides of which inclose and conform to the configuration of the nut 1, its outer surfaces being flush with the edges of the flange 2 so as to form uninterrupted tool-applying portions. The cap 4 is formed at its other end, in line with the body portion of the nut 1, with a locking ring 5 of thin metal, substantially conical in form and threaded, as at 6, to engage the thread of a bolt 7. That portion of the nut upon which the locking cap is superposed is of less depth than the cap 4, thus forming between its end and the ring 5 a recess or chamber 8.

In use the cap is placed upon the nut and the two are screwed upon a bolt. As the nut is screwed into position and the ring 5 reaches the bolted member 9 there will be a relative movement between the nut and ring causing the latter to be crowded back into the recess 8 and its metal to be firmly gripped within the thread of the bolt.

The two members of the locking nut when coupled present practically a single unit, and a tool applied to the surface of the cap will effectively screw the parts into proper position without relative movement between them, the flange 2 preventing longitudinal movement and the similar configuration of the nuts obviating relative axial turning.

The flange also effects the movement of the ring in respect to the nut by pressure on the end of the cap as the nut is screwed home, the ring collapsing within the recess 8.

It will be seen that I have produced a very simple lock nut which may be cheaply manufactured and quickly assembled for use. Both the nut and its cap may be stamped or pressed, the parts requiring no special drilling or other work, and, in casting, cores are not necessary. The necessity of the usual tapping is understood.

I claim as my invention:

1. A locking nut comprising a nut having a body portion and a circumferential flange, and a locking cap fitting over said nut and adapted to bear at one end against said flange, said cap having thread-engaging means at its other end in line with but spaced apart from the body portion of said nut, said thread engaging means being adapted to be compressed toward said nut.

2. A locking nut comprising a nut having a body portion and a circumferential flange, a locking cap of the same configuration as the body portion of said nut inclosing the latter and adapted to bear at one end against said flange, and thread engaging means at the opposite end of said cap in line with but spaced apart from the body portion of said nut, said thread engaging means being adapted to move relatively to said nut to lock the latter to a bolt.

3. A locking nut comprising a nut having a body portion and a circumferential flange, and a locking cap corresponding in formation to, and fitting over, said nut and adapted to bear at one end against said flange, the sides of said cap being flush with the edges of said flange, said cap having at its other end a cone-like thread-engaging portion in line with but spaced from the body portion of said nut, said cone-like portion being adapted to be compressed toward said nut to lock the latter to a bolt.

4. In a lock nut, a nut and a cap inclosing said nut, said cap having a thread engaging portion of relatively slight thickness.

In testimony whereof, I have signed this specification in the presence of two subscribing witnesses.

WILLIAM F. HAYES.

Witnesses:
 FRED L. SCHELLER,
 STANLEY A. HECKMAN.

Copies of this patent may be obtained for five cents each, by addressing the "Commissioner of Patents, Washington, D. C."